United States Patent
Takauchi et al.

(10) Patent No.: US 8,348,438 B2
(45) Date of Patent: Jan. 8, 2013

(54) ILLUMINATION OPTICS AND PROJECTION DISPLAY APPARATUS

(75) Inventors: Masami Takauchi, Tokyo (JP); Masahiko Nishihara, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 724 days.

(21) Appl. No.: 11/802,840

(22) Filed: May 25, 2007

(65) Prior Publication Data

US 2007/0296926 A1 Dec. 27, 2007

(30) Foreign Application Priority Data

Jun. 26, 2006 (JP) .................................. 2006-175876

(51) Int. Cl.
*G03B 21/28* (2006.01)

(52) U.S. Cl. ....................................... 353/102; 359/708

(58) Field of Classification Search .................. 353/102, 353/38; 359/708

See application file for complete search history.

(56) References Cited

U.S. PATENT DOCUMENTS

| 5,444,520 | A | 8/1995 | Murano |
| 6,552,760 | B1 * | 4/2003 | Gotoh et al. .................... 349/56 |
| 7,036,941 | B2 * | 5/2006 | Akiyama et al. .............. 353/102 |
| 2002/0036903 | A1 | 3/2002 | Okuyama et al. |
| 2003/0174294 | A1 | 9/2003 | Yanagisawa |

FOREIGN PATENT DOCUMENTS

| EP | 1 079 613 A2 | 2/2001 |
| EP | 1 118 905 A2 | 7/2001 |
| JP | 3-111806 A | 5/1991 |
| JP | 9-54279 A | 2/1997 |
| JP | 9-159968 A | 6/1997 |
| JP | 9-222581 | 8/1997 |
| JP | 9-222581 A | 8/1997 |
| JP | 2001-125193 A | 5/2001 |
| JP | 2002-40363 A | 2/2002 |
| JP | 2003-337378 | 11/2003 |
| JP | 2004-326101 | 11/2004 |

OTHER PUBLICATIONS

European Search Report dated Oct. 18, 2007.
Japanese Office Action dated Oct. 5, 2011 (with an English translation).
Chinese Office Action dated Apr. 26, 2012 with an English translation thereof.

* cited by examiner

*Primary Examiner* — Que T Le
*Assistant Examiner* — Jerry Brooks
(74) *Attorney, Agent, or Firm* — McGinn IP Law Group, PLLC

(57) ABSTRACT

An object of the present invention is to provide illumination optics that enables improvement in brightness and reestablishment of an irradiation state which is provided with illumination light and which corresponds with a display area, and is to provide illumination optics including a first fly-eye lens and a second fly-eye lens where emission light from the first fly-eye lens enter, wherein at least one of lens elements configuring the second fly-eye lens covers an irradiation area smaller than an irradiation area provided by the second fly-eye lens.

3 Claims, 12 Drawing Sheets

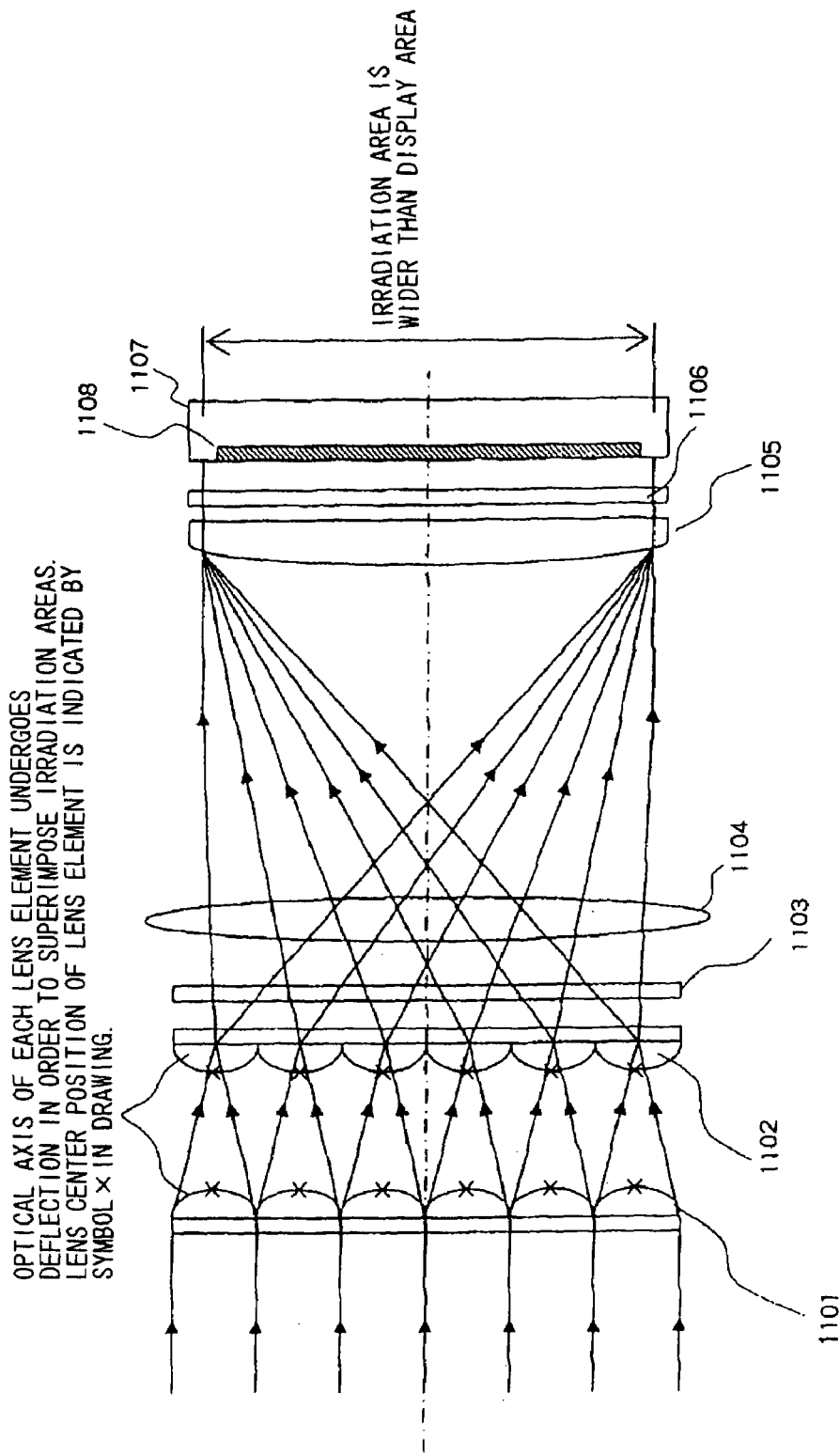

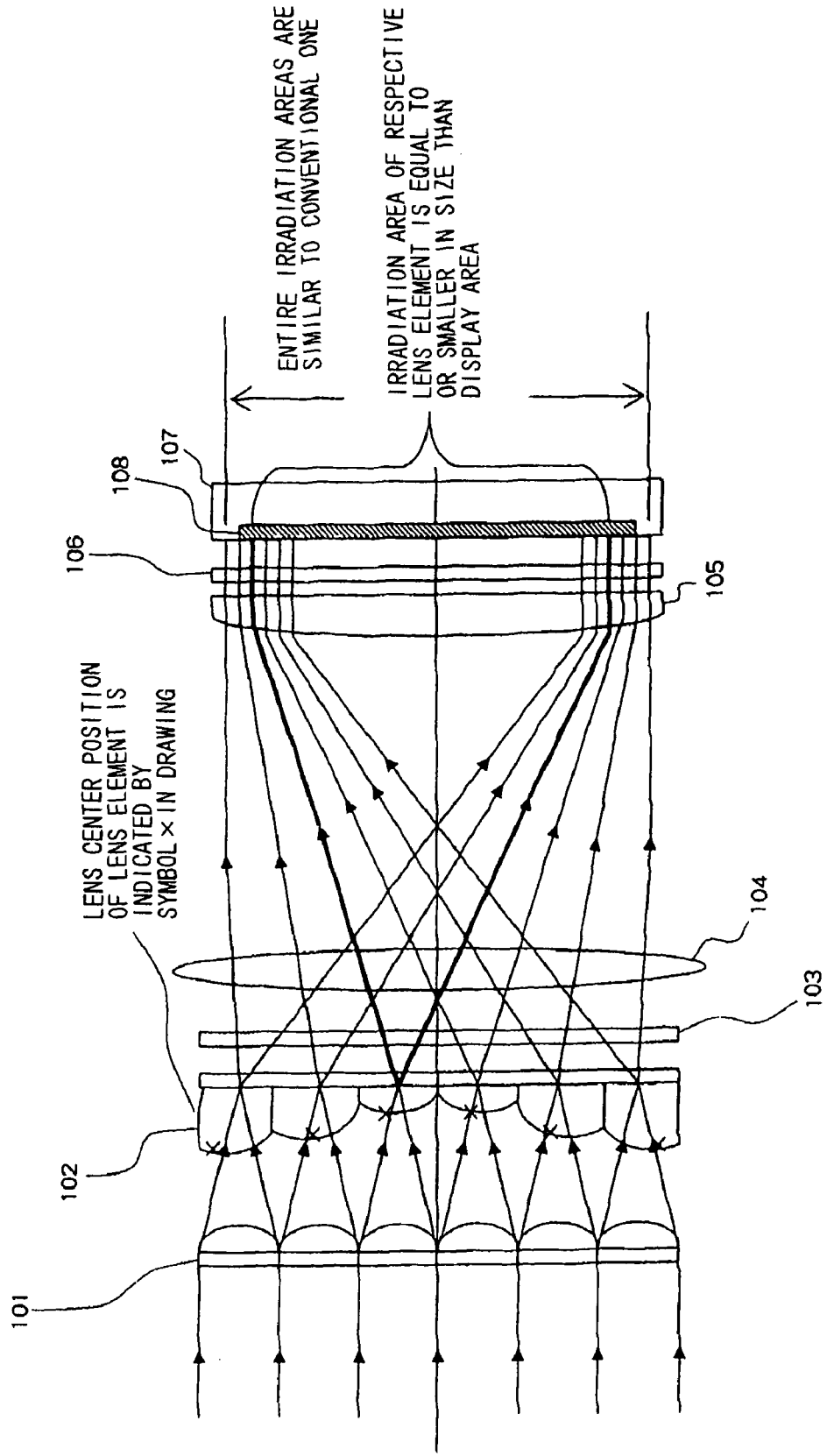

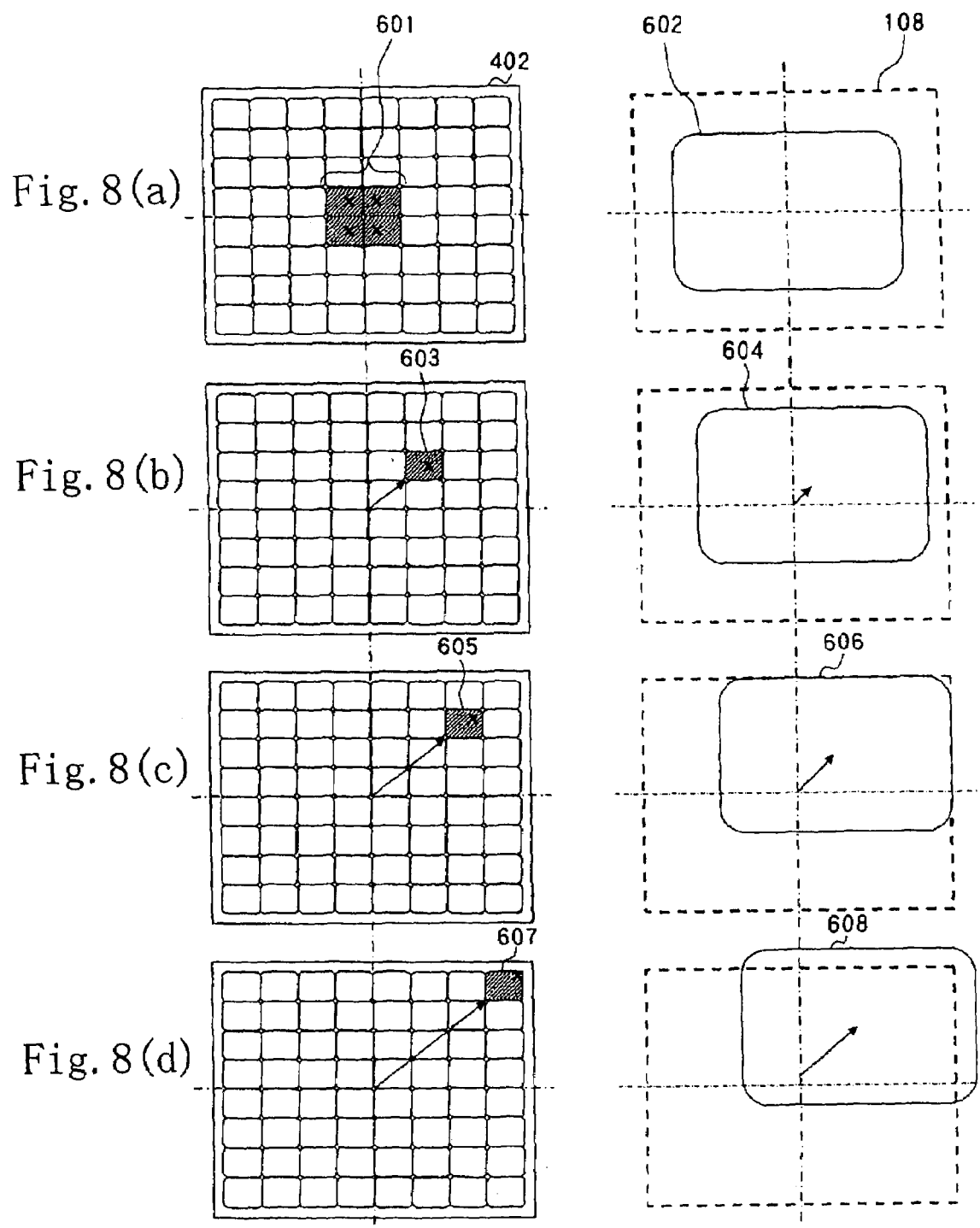

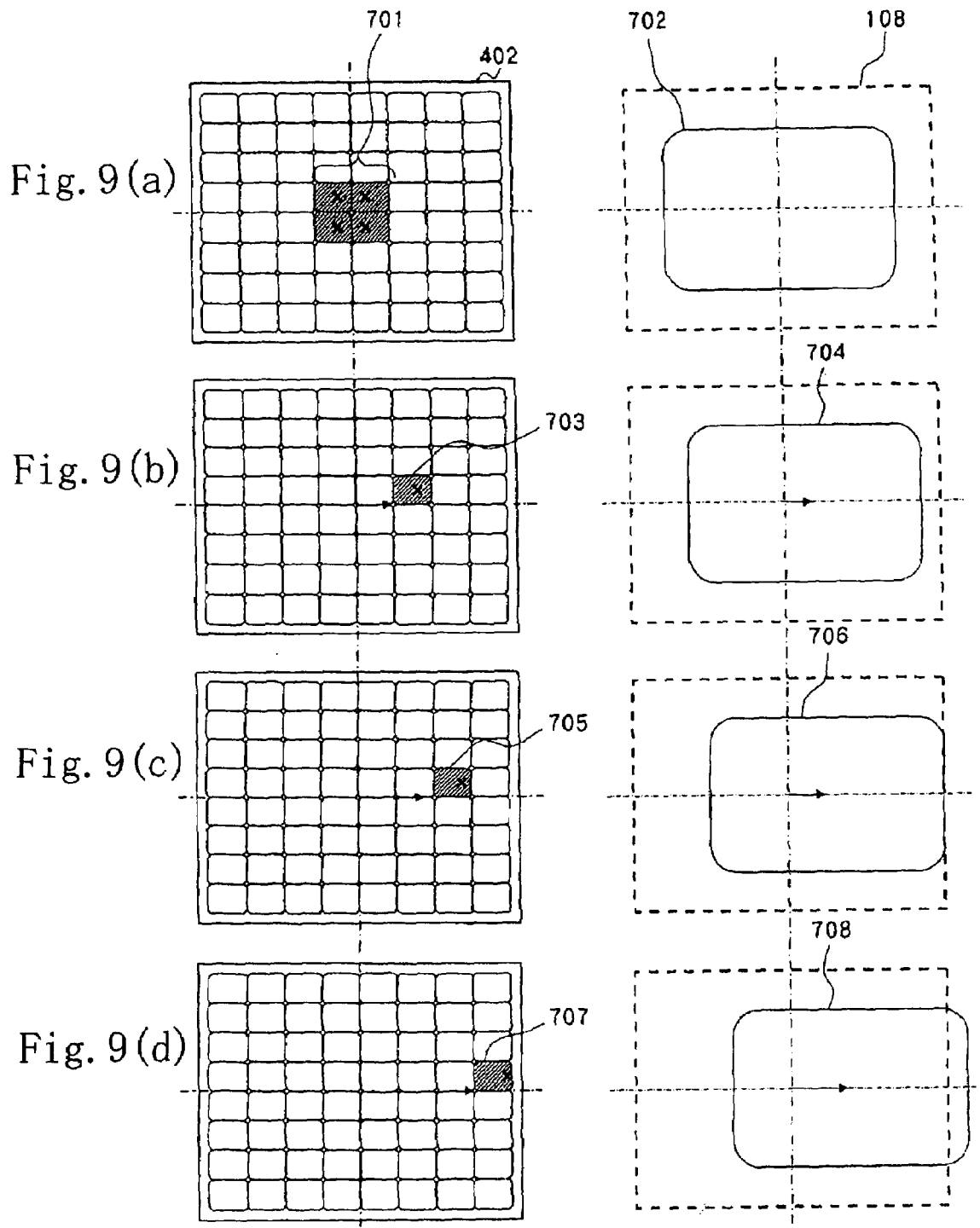

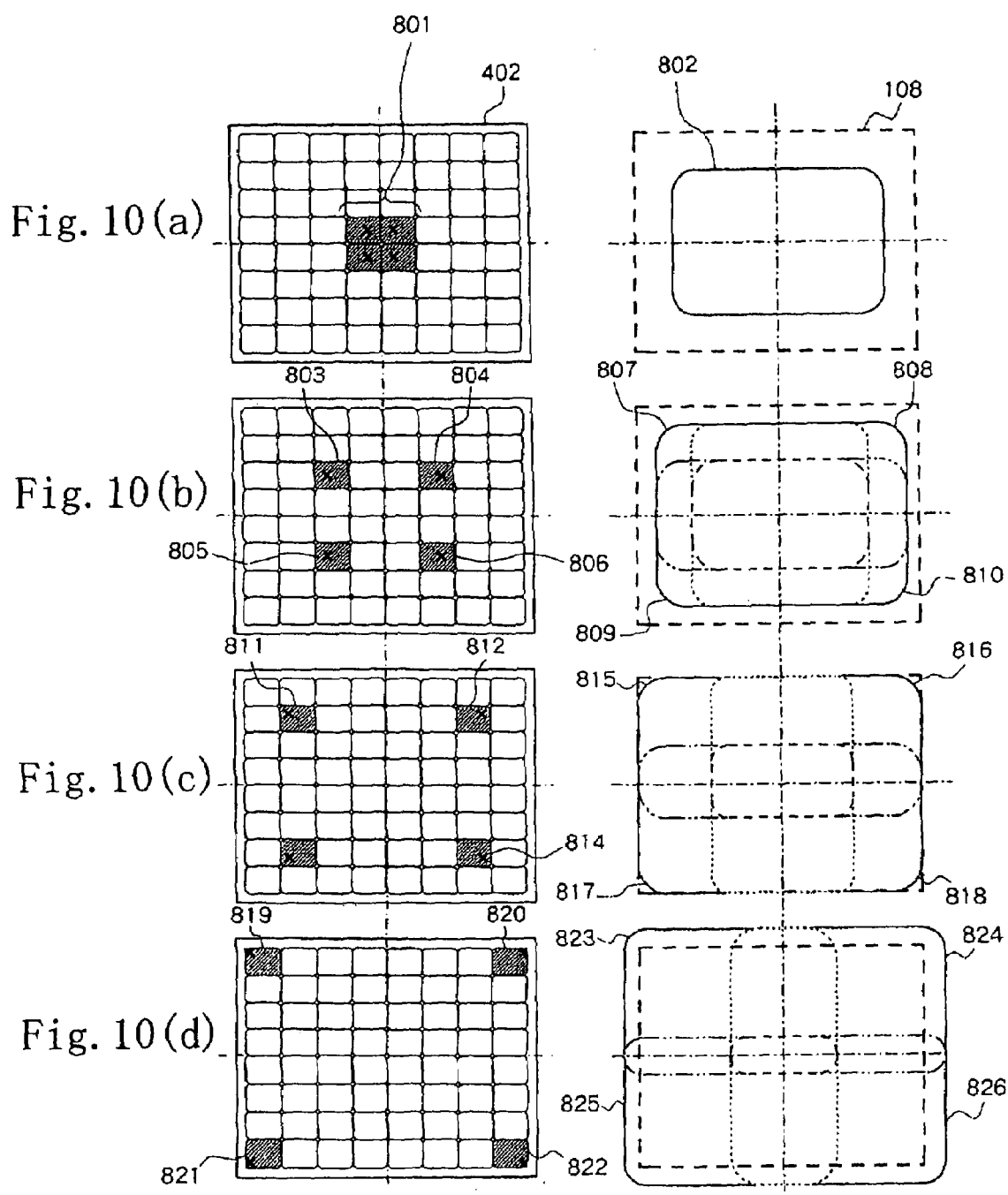

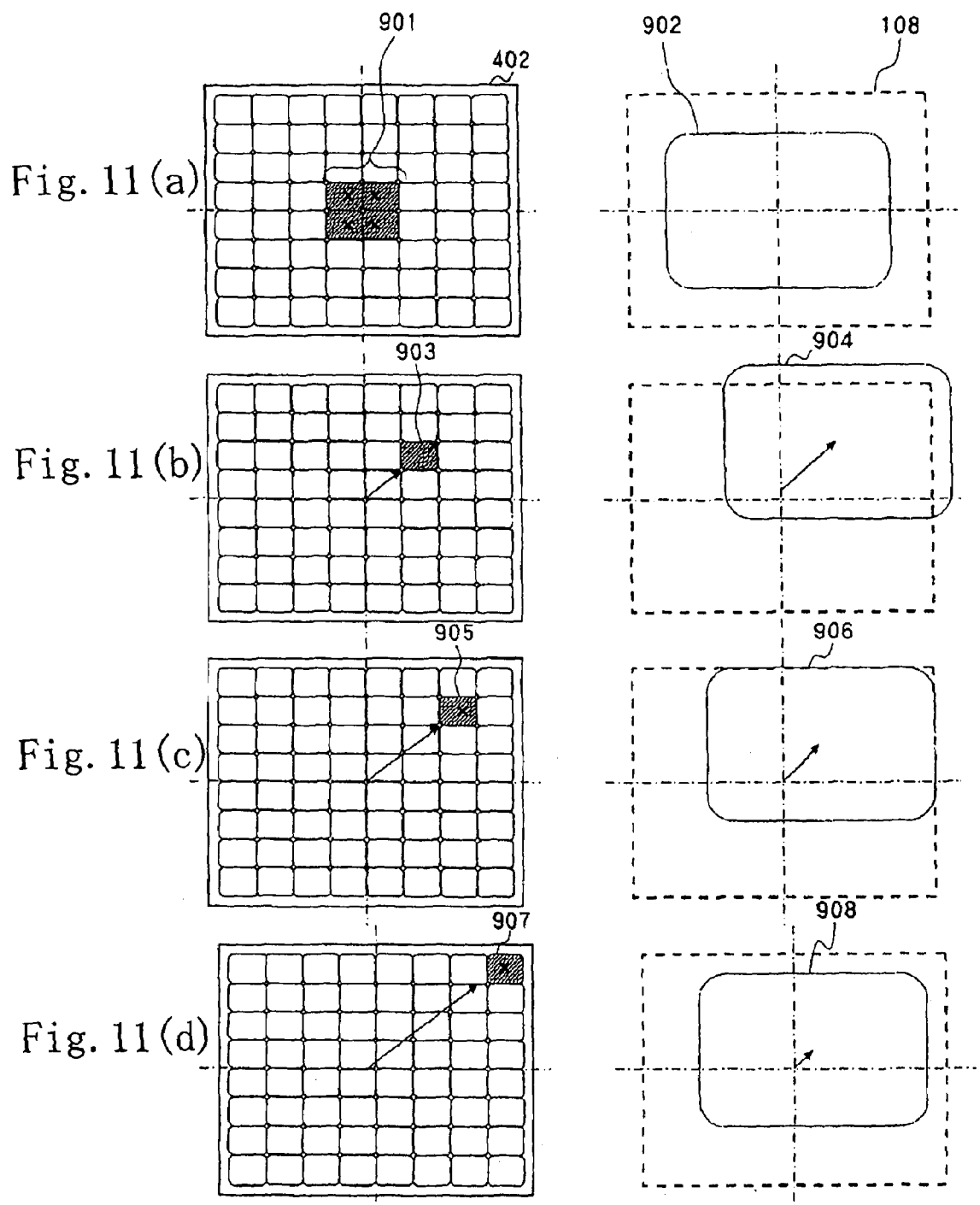

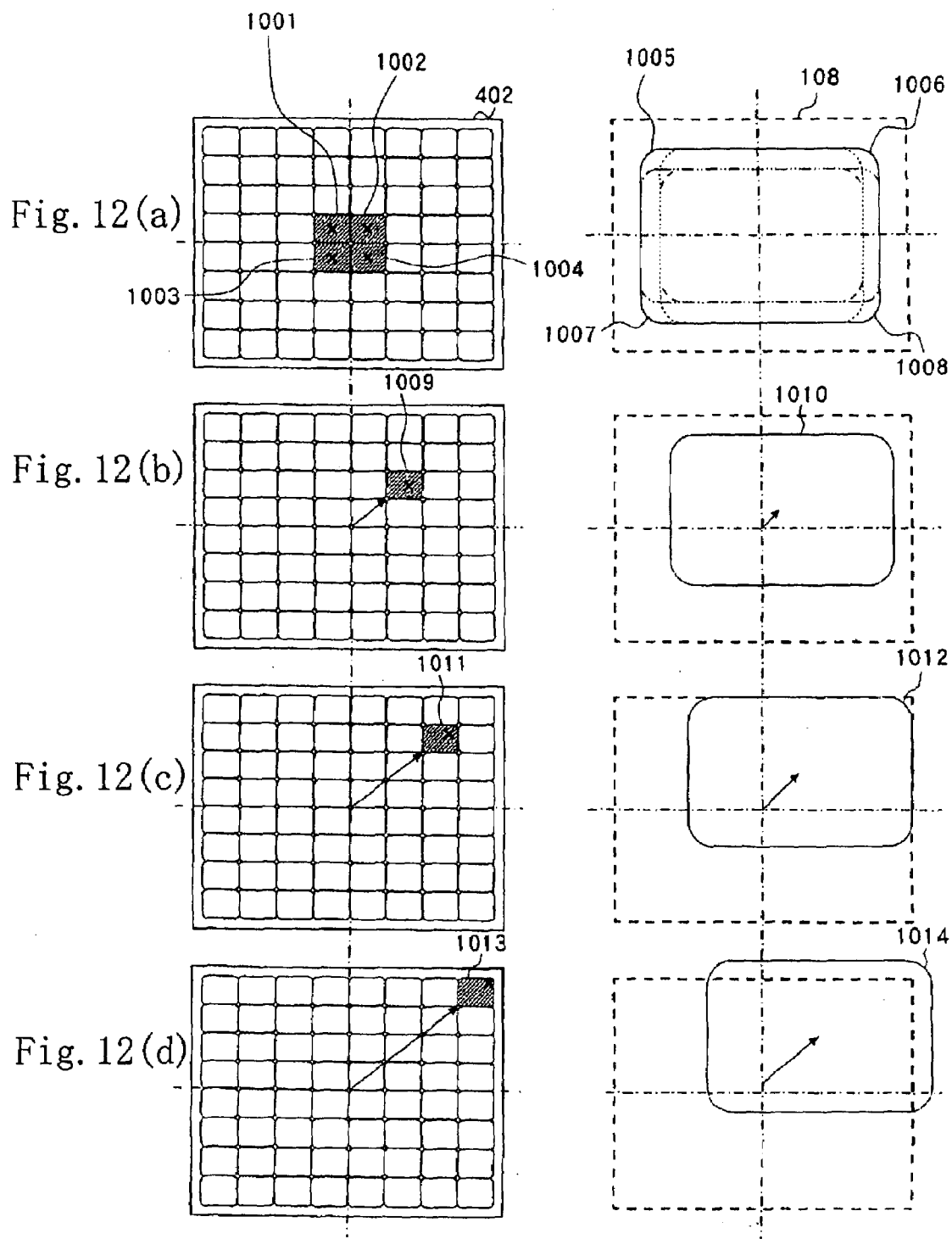

ILLUMINATION OPTICS AND PROJECTION DISPLAY APPARATUS

This application is based upon and claims the benefit of priority from Japanese patent application No. 2006-175876, filed on Jun. 26, 2006, the disclosure of which is incorporated herein its entirely by reference.

BACKGROUND OF THE INVENTION

1. Field of the Invention

The present invention relates to illumination optics and a projection display apparatus for causing a display apparatus to illuminate and, in particular, to illumination optics and a projection display apparatus comprising integrator optics having two fly-eye lenses.

2. Description of the Related Art

Japanese Patent Laid-Open No. 2003-337378 and Japanese Patent Laid-Open No. 2004-326101, for example, disclose integrator optics having two fly-eye lenses having lens elements as illustrated in FIG. 1 aligned in order.

In the description on general configuration, this type of optics comprises first fly-eye lens 1101 having a plurality of similarly-figured lens elements resembling an object for illumination in order to illuminate display apparatus 1107 shown in FIG. 1 such as an LCD with light coming out of light source (a lamp) not shown in the drawing, and second fly-eye lens 1102 with light of respective lens elements coming out of first fly-eye lens 1101 which is superimposed to form images on an object to be illuminated.

Light coming out of respective lens elements of second fly-eye lens 1102 passes polarization conversion element 1103, is aligned to provide single directional polarized light such as s-polarized light or p-polarized light, thereafter passes first field lens 1104 and second field lens 1105 and passes polarization plate 1106 to illuminate a range wider than display area 1108 that displays an image of display apparatus 1107.

Emission distribution of a lamp is not uniform over the bright center portion and the darker periphery. Therefore, that illumination distribution undergoes discretization with first fly-eye lens 1101. The discretized light enters second fly-eye lens 1102. Accordingly, light coming out of respective lens elements of second fly-eye lens 1102 differs in the brightness of illumination areas respectively.

Therefore, optical axis of a lens element is deflected so that illumination areas of light emitted out of respective lens elements of second fly-eye lens 1102 are positioned at the same place and the respective illumination regions are superimposed at the same region. That enables light having uniform illumination distribution of brightness to be irradiated onto a display area.

FIG. 2 illustrates a configuration for controlling an illumination area with the above described deflection.

FIG. 2A is a plan view illustrating the incident plane of second fly-eye lens 1102.

FIG. 2B illustrates an illumination area in the case where the center of the individual lens of first fly-eye lens 1101 corresponds with the center of the individual lens of second fly-eye lens 1102 at optical axis C. Each lens configuring respective fly-eye lens illustrated in FIG. 2A is in the state illustrated in FIG. 2B and then illumination areas having light emitted out from respective lens element of second fly-eye lens 1102 will provide respectively different regions in which uniform illumination light is lost.

In order to provide uniform illumination light, the lens at the diagonally-lined site in FIG. 2A of second fly-eye lens 1102 is in a deflected state with the lens center in a location deviated from optical axis C as illustrated in FIG. 2C. Thereby, the illumination area moves. The amount of deflection of the respective lens, that corresponds with the location in the incident plane, will differ so that the illumination area having light that comes out of the respective lens element of second fly-eye lens 1102 will occupy the same position as illustrated in FIG. 1.

As described above, the light coming out of the second fly-eye lens is configured to irradiate a range wider than the display area of an object for illumination. That is intended to cope with dispersion in optical axis adjustment on illumination optics during production and to cope with optical axis displacement due to impacts and the like when used after production.

In the case where dispersion in optical axis adjustment and impact cause the displacement of the optical axis to differ from design values, the illumination light that is emitted from the second fly-eye lens illuminates a display element at a location that departs from the designed location so as, in the worst case, not to illuminate any display area, or to cause display of a partial video in case where a projection display apparatus is configured.

In order to prevent such an occurrence, the light coming out of the second fly-eye lens irradiates a range wider than the display area of the object for illumination. That is, the illumination area is provided with a marginal portion that is to be illuminated. The light illuminated onto that marginal portion will not contribute to illuminating the projection image in the case where no optical axis displacement occurs. Conventionally, each lens configuring the second fly-eye lens is configured to illuminate the same region including the marginal portion. Therefore, brightness of the marginal portion originally not contributing to the projection image provides with the same brightness as the display area, thus acting to hamper improvement in optical utilization efficiency (improvement in brightness).

On the other hand, the second fly-eye lens is designed so that a uniform illumination area is obtainable by causing deflection of the respective optical axis of a plurality of component lens elements to cause the same illumination area to undergo irradiation. Respective optical axes of lens elements configuring the second fly-eye lens may deviate from the designed values in the level of deflection during manufacturing steps. Then only irradiation areas that are irradiated with illumination light from those lens elements are deflected. Consequently, there will be a portion that will have decreased brightness in the area that originally required illumination.

A phenomenon called a shadow in which light is not uniformly and evenly dispersed appears in the portion that is subject to a decrease in brightness, as described above. That shadow will become more pronounced as the other illumination areas become more uniform.

In order to prevent the above described shadow from appearing, it is necessary to limit deviation of the amount of deflection of the respective optical axes of the lens elements that configure the second fly-eye lens during manufacturing so that illumination areas having the same size are superimposed on the same location, and this requires extremely high technological capability. Consequently, management of production quality becomes difficult, resulting in higher costs.

In addition, the area which an individual focuses upon, when looking at a projected image, is the center portion of the display where many important videos are projected. Therefore a shadow that occurs in the center will become highly pronounced compared with a shadow that occurs at the edges. Moreover, important parts of videos are frequently displayed in the central portion of the video window, and it is therefore desirable that this central portion be brighter than the periphery. However, in the case of a configuration with respective lenses configure the second fly-eye lens to irradiate the same region, there is the probability that a shadow will be generated and that a uniform brightness will occur throughout all of the regions so that there will not be a irradiation state that correspond to the display area.

SUMMARY OF THE INVENTION

The goal of the present invention is to solve the above described problems of the related arts and an object thereof is to provide illumination optics and a projection display apparatus enabling improvement in brightness and an irradiation state irradiated with illumination light to correspond with a display area.

The illumination optics of the present invention is illumination optics comprising a first fly-eye lens and a second fly-eye lens where emission light coming out of the first fly-eye lens enters, wherein at least one of lens elements that configures the second fly-eye lens provides irradiation to an irradiation area with light that is smaller than the illumination area irradiated by all of the lens elements of the second fly-eye lens.

In that case, a plurality of lens elements arranged in the vicinity of a center of the second fly-eye lens may provide irradiation light to its irradiation area that occupies the same region near the center of the illumination area, and locations of irradiation areas that are irradiated with light from the other lens elements (in the irradiation areas) may correspond to arrangements of the lens elements in the second fly-eye lens.

In addition, a plurality of lens elements arranged in the vicinity of a center of the second fly-eye lens provide irradiation light to their irradiation areas that occupy the same region near the center of the illumination area, and the other lens elements that come closer to the center of the second fly-eye lens use the periphery of the illumination area as their irradiation areas, while the lens elements that become more remote from the second fly-eye lens provide irradiation light to their irradiation areas that become closer to the center of the illumination area.

Moreover, lens elements configuring the second fly-eye lens may be located so as to provide with the illumination areas of their irradiation areas corresponding to the arrangement in the second fly-eye lens.

The projection display apparatus of the present invention is a projection display apparatus comprising:

a first fly-eye lens;

a second fly-eye lens where emission light coming out of the first fly-eye lens enters; and a display apparatus illuminated by emission light of the second fly-eye lens, wherein at least one of lens elements configuring the second fly-eye lens provides its irradiation area that is smaller than an illumination area that illuminates the display apparatus.

In that case, a plurality of lens elements arranged in the vicinity of the center of the second fly-eye lens may provide with its irradiation area that occupies the same region near the center of the illumination area and locations of irradiation areas of the other lens elements in the irradiation areas may correspond to arrangements in the second fly-eye lens.

In addition, a plurality of lens elements arranged in the vicinity of a center of the second fly-eye lens provide irradiation light to their irradiation areas that occupy the same region near the center of the illumination area, and the other lens elements that come closer to the center of the second fly-eye lens use the periphery of the illumination area as their irradiation areas, while the lens elements that become more remote from the second fly-eye lens provide irradiation light to their irradiation areas that become closer to the center of the illumination area.

Moreover, lens elements configuring the second fly-eye lens may be located to provide the illumination areas with light that corresponding the second fly-eye lens that provide irradiated light to the irradiation area.

In the present invention configured as described above, all of the lens elements configuring a fly-eye lens do not irradiate the same region but the illumination optics include lens elements that irradiate regions that are smaller than the illumination area. Therefore, illumination distribution of illumination areas can be controlled corresponding with the regions. By individually controlling illumination of the display area and marginal portions which conventionally are set to provide the same illumination, it is possible to increase illumination of the display area, which needs to have a brighter and a higher illumination than the marginal portions.

In addition, illumination distribution of the illumination areas can be controlled corresponding with the regions. Therefore, display areas, where a shadow is apt to become pronounced, and display areas, where important elements are frequently displayed, undergo irradiation with more lens elements and thereby can be made brighter to limit generation of shadows which may appear in the other display areas.

The above and other objects, features, and advantages of the present invention will become apparent from the following description with reference to the accompanying drawings which illustrate examples of the present invention.

BRIEF DESCRIPTION OF THE DRAWINGS

FIG. 1 illustrates integrator optics including two fly-eye lenses having lens elements aligned in order;

FIG. 3 is a diagram illustrating configuration of an embodiment of illumination optics according to the present invention;

FIG. 8A to FIG. 8D are diagrams respectively illustrating an arrangement of respective lens elements of second fly-eye lens 403 and respective illumination areas according to the embodiment illustrated in FIG. 6;

FIG. 9A to FIG. 9D are diagrams respectively illustrating an arrangement of respective lens elements of second fly-eye lens 403 and respective illumination areas according to the embodiment illustrated in FIG. 6;

FIG. 10A to FIG. 10D are diagrams respectively illustrating an arrangement of respective lens elements of second fly-eye lens 403 according to the embodiment illustrated in FIG. 6 and respective illumination areas;

FIG. 11A to FIG. 11D are diagrams respectively illustrating an arrangement of respective lens elements of second fly-eye lens 403 and respective illumination areas; and FIG. 12A to FIG. 12D are diagrams respectively illustrating an arrangement of respective lens elements of second fly-eye lens 403 according to the embodiment illustrated in FIG. 3 and respective irradiation areas.

DETAILED DESCRIPTION OF THE PREFERRED EMBODIMENTS

Figure 2A:
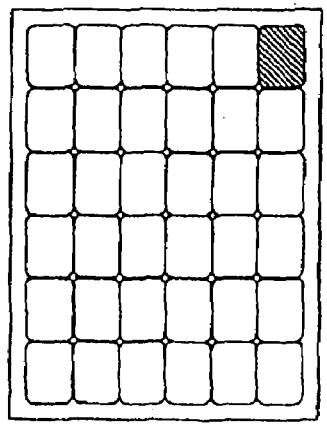
FIG. 2A to FIG. 2C respectively illustrate diagrams for describing configuration to control an illumination area with deflection.
Figure 2B:
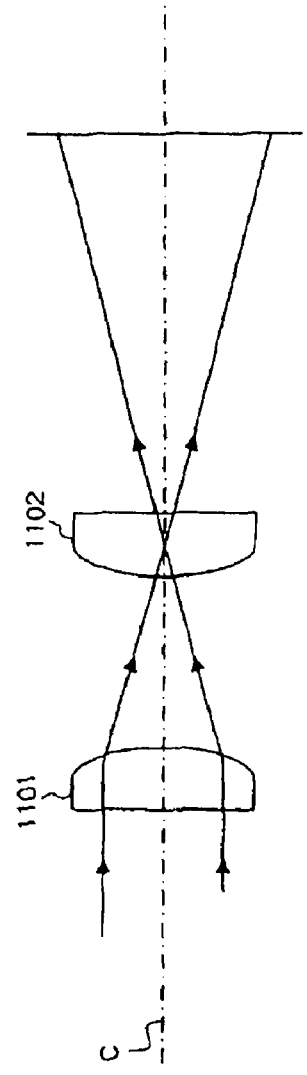
Figure 2C:
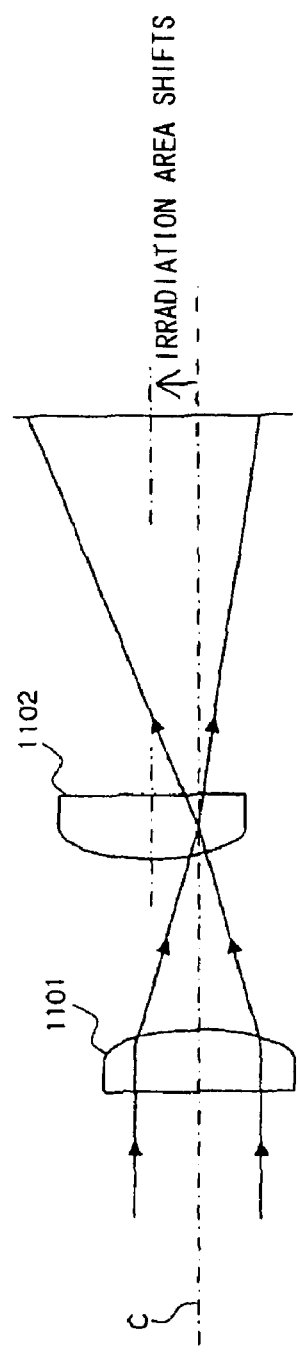

Next, an embodiment of the present invention will be described with reference to the drawings.

FIG. 3 is a diagram illustrating configuration of an embodiment of illumination optics according to the present invention. FIG. 3 illustrates a case with a view taken from one direction of an optical system. The case with a view taken from the direction subject to rotation by 90-degree around the optical axis as the center is configured likewise as well.

In order to irradiate display apparatus 107 such as a LCD with light coming out of a light source (lamp) not shown in the drawing, the embodiment is configured by first fly-eye lens 101 having a plurality of lens elements shaped similar to an object that is to be irradiated and second fly-eye lens 102 that superimposes light coming out of first fly-eye lens 101 to form an image onto an object for irradiation.

Light coming out of respective lens elements of second fly-eye lens 102 passes polarization conversion element 103 that is aligned to provide single directional polarized light such as s-polarized light or p-polarized light, for example, and thereafter passes first field lens 104 and second field lens 105, passes polarization plate 106 to illuminate display area 108 that displays an image of display apparatus 107.

Figure 4:
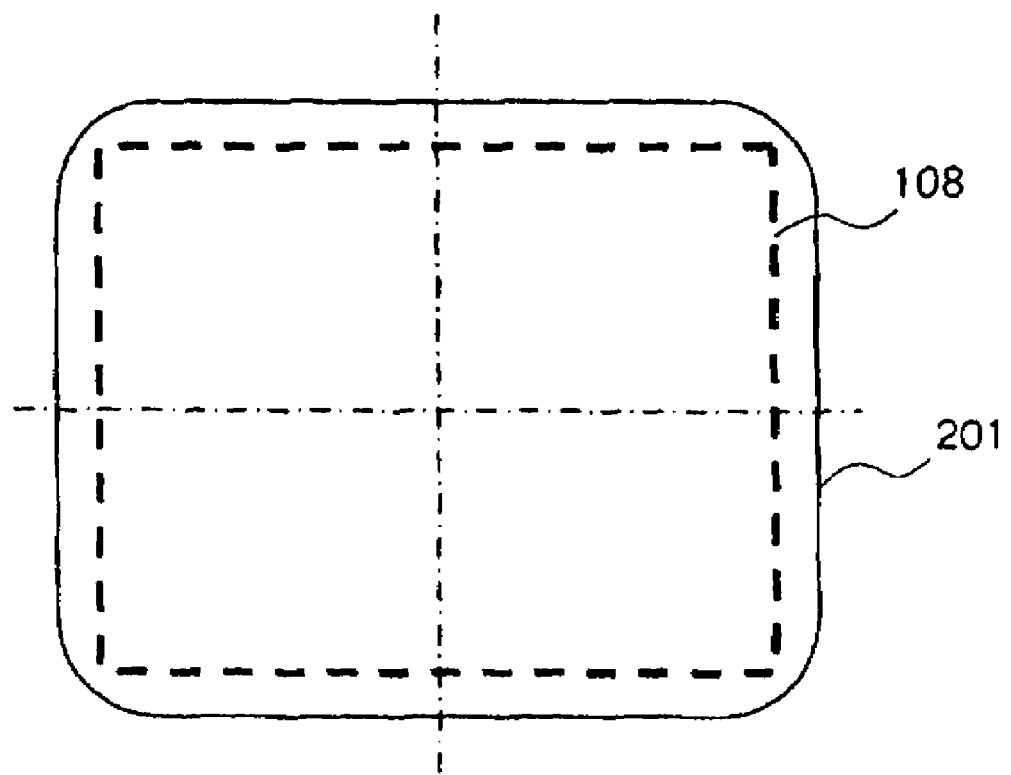
FIG. 4 is a plan view taken from the irradiation side to illustrate the relation between display area 108 and irradiation area 201 with second fly-eye lens 102 in the embodiment illustrated in FIG. 3.

FIG. 4 is a plan view taken from the irradiation side to illustrate the relation between display area 108 and illumination area 201 with second fly-eye lens 102 in the present embodiment.

In the conventional example illustrated in FIG. 1, the region is superimposed with the same region that is illuminated by light that is emitted from respective lens elements of second fly-eye lens 1102. In contrast, the present embodiment is designed to provide mutually different regions irradiated by light coming out of the respective lens element of second fly-eye lens 102 subject to gradual displacement. The regions that are irradiated with light from the respective lens element are designed to be equal to or smaller in size than the display area of the object that is to be irradiated, or to be smaller than the maximum area in a conventional optical system.

Therefore, irradiation area 201 will not be covered by the single unit of an lens element. However, the outer circumference portion of the display area, as well as the region that reaches the side slightly outside the display area, is designed to be irradiated by deflection of the optical axis of a predetermined lens element. The individual lens element irradiates a range that is smaller than a conventional irradiation area but is designed to be equivalent to a conventional irradiation area by superimposing irradiation areas that are irradiated with light from all the lens elements.

FIG. 5 is a diagram for describing illumination distribution in the irradiation region in each of the embodiments illustrated in FIG. 3 and the conventional example illustrated in FIG. 1.

Figure 5A:
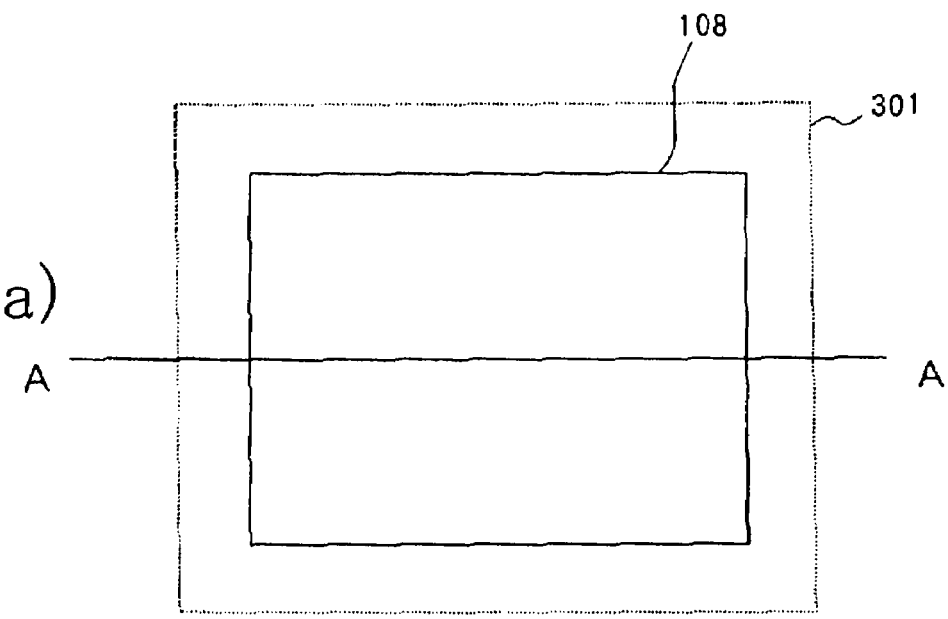
FIG. 5A illustrates the relation between display area 108 and illumination area 301 obtained by second fly-eye lens 102 in the embodiment illustrated in FIG. 3

In each of the embodiments illustrated in FIG. 3 and the conventional example illustrated in FIG. 1, the same area of irradiation region 301, as the area illustrated in FIG. 5A, is illustrated with light. Irradiation region 301 includes display area 108.

Figure 5B:
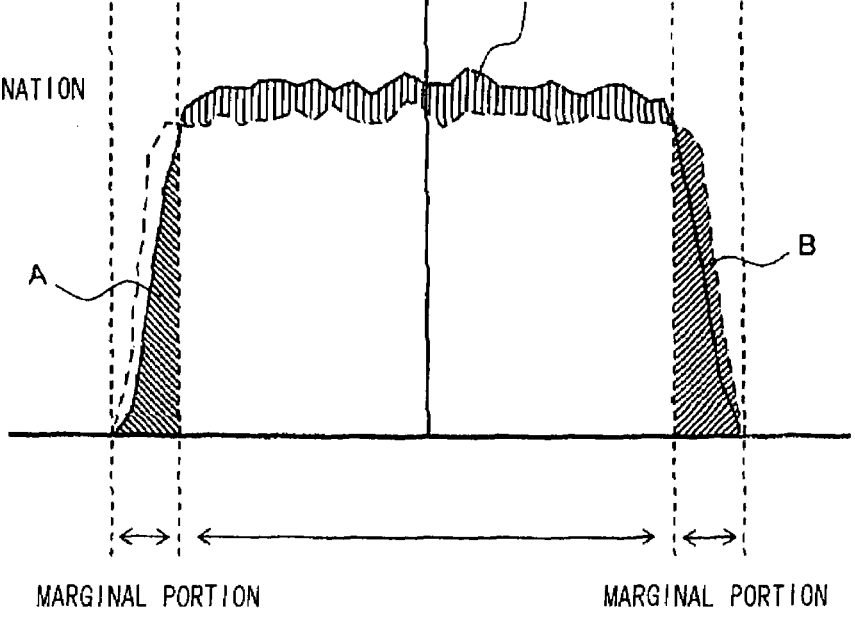
FIG. 5B is a diagram illustrating illumination distribution along line A-A in FIG. 5A.

FIG. 5B is a diagram illustrating illumination distribution along line A-A in FIG. 5A. The full lines illustrate illumination distribution of the embodiment illustrated in FIG. 3 and the dashed lines illustrate illumination distribution of the conventional example illustrated in FIG. 1. As illustrated, illumination distribution of either the embodiment illustrated in FIG. 3 or the conventional example illustrated in FIG. 1 will be symmetrical about the center of display area 108. The present embodiment is designed to gradually displace the region irradiated by a lens element. Therefore, the area of region A that illustrates the total amount of irradiation light in the marginal portion will become smaller than region B that illustrates the total amount of illumination light in the marginal portion of the conventional embodiment illustrated in FIG. 1. The total amount of irradiation light in display area 108 will become larger due to the portion of region C.

As described above, the amount of light to irradiate the marginal portion, except display area 108 of display element 107, is designated to be smaller than in the conventional example illustrated in FIG. 1. That portion irradiates display area 108. Therefore the brightness of display area 108 will have a higher intensify than the prior art.

Figure 6:
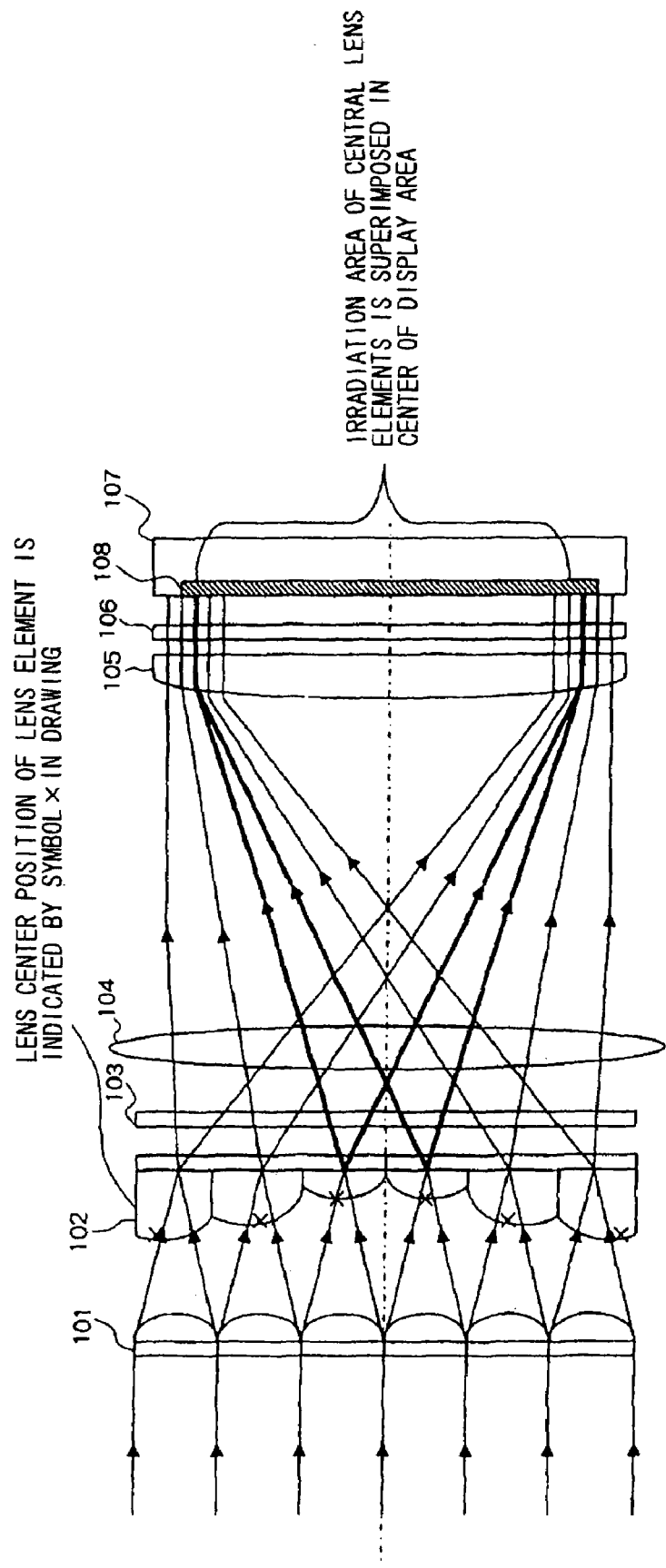
FIG. 6 is a diagram illustrating configuration of another embodiment according to the present invention.

FIG. 6 is a diagram illustrating the configuration of another embodiment according to the present invention. FIG. 6 illustrates a case with a view taken from one direction of an optical system. The case with a view taken from the direction subject to rotation by 90-degree about the optical axis as the center is similarly configured as well.

In the embodiment illustrated in FIG. 3, the irradiation area that is irradiated with light from the respective lens element of second fly-eye lens 102 undergoes gradual displacement so that different lens elements will never irradiate the same irradiation area. In contrast, in the present embodiment, irradiation is executed so that the irradiation area of the lens element in the center of second fly-eye lens 102 is superimposed in the vicinity of the center of the display area 108. Consequently, the brightness in the vicinity of the center of display area 108 as well as the uniformity in illumination have a higher intensity than that of the embodiment illustrated in FIG. 3.

In addition, in the present embodiment, the quantity of lens elements for irradiating illumination light to the vicinity of the center of display area 108 is designed to be larger than the quantity of lens element for irradiating illumination light to the marginal portion. Therefore, the shadow appearing in the vicinity of the center of display area 108 will become less pronounced than the shadow appearing in the marginal portion.

The lens elements arranged in the periphery are arranged so that the respective irradiation areas are orientated to spread in the irradiation direction from the center of display area 108 on the plane of display area 108. The irradiation areas that are irradiated by respective elements of the second fly-eye lens are arranged at a slight distance from the irradiation area that is irradiated by the lens elements arranged in the center. Thereby, most of the irradiation areas of display area 108 are superimposed to undergo uniform irradiation.

At that occasion, the periphery of display area 108 and the portion undergoing irradiation in the marginal portion outside display area 108 will drop in illumination. Therefore, illumination is designed to drop gradually so as not to cause shadows. As an example, illumination is not made to drop to such a level that differences in luminance will be recognized in display area 108. Otherwise, for illumination optics that causes red, green and blue to undergo color separation, there nominated is a method that will unify the drop in illumination distribution for each color that will decrease in chromaticity difference inside display area 108.

A certain amount of deflection of optical axis of the lens elements of the second fly-eye lens occasionally occurs on the designed value. Then positional displacement of those irradiation areas occurs in some spots. However, because illumination drops gradually, the difference in brightness between the spot where brightness decreases and the nearby spot where there is brightness, is small which serves to limit generation of shadow.

Next, a projection display apparatus according to the present invention will be described.

Figure 7:
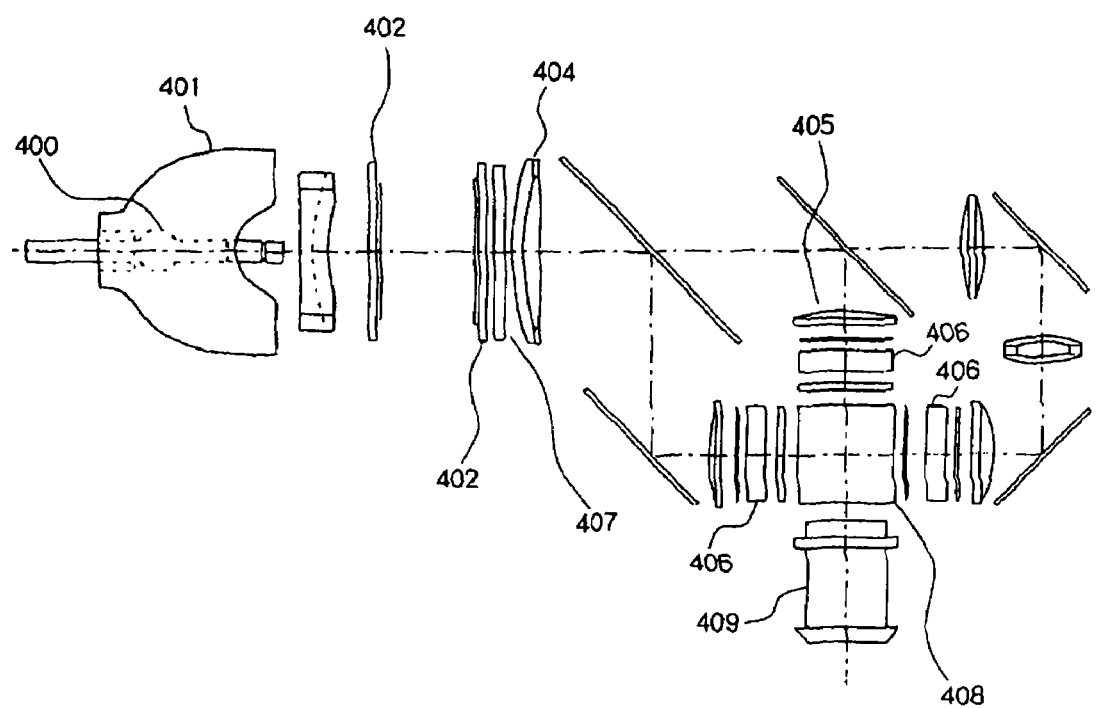
FIG. 7 is a block diagram illustrating configuration of key parts of a projection display apparatus provided with the illumination optics according to the present invention.

FIG. 7 is a block diagram illustrating configuration of key parts of a projection display apparatus provided with illumination optics according to the present invention.

Light (white light) emitted from light source 400 is reflected by reflection mirror 401, is split to each lens element with first fly-eye lens 402 configured by a plurality of lens elements similarly-shaped as display apparatus 406 such as an LCD and passes second fly-eye lens 403 having lens elements that corresponding with the respective lens element of first fly-eye lens 402. The light coming out of second fly-eye lens 403 passes polarization conversion element 407 and first field lens 404, thereafter, is split into R, G and B with a dichroic mirror, passes second field lens 405 prepared for respective colors R, G and B and is superimposed on display apparatus 406 prepared for respective colors R, G and B. Thereafter, image light of each color R, G and B which passed through respective display apparatus 406 is synthesized by cross-dichroic prism 408 and is magnified and projected onto a screen (not illustrated in the drawing) with projection lens 409.

FIG. 8 to FIG. 10 are diagrams respectively illustrating an arrangement of respective lens elements of second fly-eye lens 403 and respective illumination areas according to the embodiment illustrated in FIG. 6.

In each drawing of FIGS. 8A to 8D, plan views of fly-eye lens 403 are on the left side in the drawing while plan views of display area 108 undergoes irradiation of light from fly-eye lens 403 are on the right side in the drawing.

Irradiation areas irradiated by light from the respective four lens elements configuring lens element group 601 located in the center of fly-eye lens 403 illustrated in FIG. 8A are designed to be superimposed in the center of display area 108 in order to increase brightness of the center of display area 108. Thereby irradiation area 602 is formed.

As illustrated in FIGS. 8B to 8D, irradiation areas 604, 606 and 608 provided by lens elements 603, 605 and 607, that are respectively subject to single shifts to the adjacent cells in the vertical and horizontal direction from the center, reflect movements of irradiation area 602 from the center of display area 108. The lens elements arranged in the periphery of second fly-eye lens 403 irradiate the periphery of display area 108. Here, the lens center position of a lens element is indicated by symbol x in the drawing.

Difference in irradiation area due to the position of the lens element in the horizontal direction will be described with reference to FIG. 9.

Respective irradiation areas of four lens elements configuring lens element group 701 located in the center of fly-eye lens 403 illustrated in FIG. 9A are superimposed in the center of display area 108 in order to increase brightness of the center of display area 108. Thereby irradiation area 702 is formed.

As illustrated in FIGS. 9B to 9D, irradiation areas 704, 706 and 708 provided by lens elements 703, 705 and 707 located subject to single shifts respectively in the horizontal direction from the center reflect movements of irradiation area 702 from the center of display area 108. The lens elements arranged in the periphery of second fly-eye lens 403 irradiate the periphery of display area 108. Here, the lens center position of a lens element is indicated by symbol x in the drawing.

FIGS. 10A to 10D are diagrams illustrating the states for superimposing irradiation areas with a plurality of lens elements of the second fly-eye lens illustrated in FIGS. 8A to 8D and FIGS. 9A to 9D.

Irradiation areas irradiated with light from the respective four lens elements configuring lens element group 801 located in the center of fly-eye lens 403 illustrated in FIG. 10A are designed to be superimposed in the center of display area 108 in order to increase brightness of the center of display area 108. Thereby irradiation area 802 is formed.

As illustrated in FIGS. 10B to 10D, irradiation areas 807 to 810, 815 to 818 and 823 to 826 provided by lens elements 803 to 806, 811 to 814 and 819 to 822, that are respectively subject to single shifts respectively to the adjacent cells in the vertical and horizontal direction from the center, reflect movements of irradiation area 802 from the center of display area 108. The lens elements arranged in the periphery of second fly-eye lens 403 irradiate the periphery of display area 108. Thereby, the range equivalent to the irradiation area provided by a conventional integrator illumination system undergoes irradiation. As for the lens elements not illustrated in FIG. 10, the amount of deflection of their optical axes is determined so as to determine positions of irradiation areas corresponding to the areas where they are located. Here, the lens center position of a lens element is indicated by symbol x in the drawing.

Unlike the embodiments illustrated in FIGS. 8A to 8D through to FIGS. 10A to 10D, FIGS. 11A to 11D illustrate an embodiment with their irradiation areas which move from the periphery of display area 108 to the center in order starting from the lens element near the lens element adjacent to the lens element in the center of second fly-eye lens 402.

Irradiation areas irradiated light from the respective four lens elements configuring lens element group 901 located in the center of fly-eye lens 403 illustrated in FIG. 11A are designed to be superimposed in the center of display area 108 in order to increase brightness of the center of display area 108. Thereby irradiation area 902 is formed.

As illustrated in FIGS. 11B to 11D, irradiation areas 904, 906 and 908 provided by lens elements 903, 905 and 907, that are respectively subject to single shifts to the adjacent cells in the vertical and horizontal direction from the center, reflect movements from the periphery of display area 108 toward the center. Here, the lens center position of a lens element is indicated by symbol x in the drawing.

In consideration of the projection display apparatus having the configuration illustrated in FIG. 7, illumination distribution of light source 400 generally becomes brighter as it gets closer to the optical axis center of fly-eye lens 402. Therefore, for the embodiment illustrated in FIG. 11, a decrease in brightness in the periphery is alleviated so as to plan for uniform illumination in display area 108. Here, the optical axis position of a lens element is indicated by symbol x in the drawing.

The brightness of a projector comprising integrator optics with a 0.7-inch LCD becomes superior by approximately 9% to the brightness in convention examples through simulation with the fly-eye lens in the mode shown in FIG. 11.

FIGS. 12A to 12D are diagrams respectively illustrating an arrangement of respective lens elements of second fly-eye lens 403 according to the embodiment illustrated in FIG. 3 and respective irradiation areas.

In FIGS. 12A to 12D, plan views of fly-eye lens 403 are on the left side in the drawing while plan views of display area 108 undergo irradiation of light from fly-eye lens 403 are on the right side in the drawing.

Irradiation areas 1005 to 1008 that are irradiated with light from respective lens element 1001 to 1004 located in the center of fly-eye lens 403 illustrated in FIG. 12A are designed to be respectively different. As illustrated in FIGS. 12B to 12D, irradiation areas 1010, 1012 and 1014 provided by lens elements 1009, 1011 and 1013, that are respectively subject to single shifts to the adjacent cells in the vertical and horizontal direction from the center, reflect movements from the center of display area 108. The lens elements arranged in the periphery of second fly-eye lens 403 irradiate the periphery of display area 108. Here, the lens center position of a lens element is indicated by symbol x in the drawing.

While preferred embodiments of the present invention have been described using specific terms, such description is for illustrative purposes only, and it is to be understood that changes and variations may be made without departing from the spirit or scope of the following claims.

What is claimed is:

1. Illumination optics, comprising:
a first fly-eye lens; and
a second fly-eye lens where emission light coming out of the first fly-eye lens enters,
wherein at least one of lens elements configuring the second fly-eye lens provides irradiation to its irradiation area that is smaller than an illumination area that is irradiated with light from all the lens elements of the second fly-eye lens,
wherein the irradiation area of the at least one of lens elements overlaps with an irradiation area of another one of the lens elements,
wherein a plurality of lens elements arranged in a vicinity of a center of the second fly-eye lens provides irradiation light to its irradiation area that occupies a same region near a center of the illumination area, and
wherein a thickness of the lens elements of the second fly-eye lens continuously decreases from an edge to a center of the second fly-eye lens.

2. Illumination optics, comprising:
a first fly-eye lens; and
a second fly-eye lens where emission light coming out of the first fly-eye lens enters,
wherein at least one of lens elements configuring the second fly-eye lens provides irradiation to its irradiation area that is smaller than an illumination area that is irradiated with light from all the lens elements of the second fly-eye lens,
wherein the irradiation area of the at least one of lens elements overlaps with an irradiation area of another one of the lens elements,
wherein a plurality of lens elements arranged in a vicinity of a center of the second fly-eye lens provides irradiation light to its irradiation area that occupies a same region near a center of the illumination area,
wherein a thickness of one of the lens elements of the second fly-eye lens is more than a thickness of an adjacent one of the lens elements of the second fly-eye lens located on a side of the one of the lens elements of the second fly-eye lens, and
wherein the thickness of the one of the lens elements of the second fly-eye lens is less than a thickness of another adjacent one of the lens elements of the second fly-eye lens located on an other side of the one of the lens elements of the second fly-eye lens.

3. Illumination optics, comprising:
a first fly-eye lens; and
a second fly-eye lens where emission light coming out of the first fly-eye lens enters,
wherein at least one of lens elements configuring the second fly-eye lens provides irradiation to its irradiation area that is smaller than an illumination area that is irradiated with light from all the lens elements of the second fly-eye lens,
wherein the irradiation area of the at least one of lens elements overlaps with an irradiation area of another one of the lens elements,
wherein a plurality of lens elements arranged in a vicinity of a center of the second fly-eye lens provides irradiation light to its irradiation area that occupies a same region near a center of the illumination area,
wherein a thickness of each of the plurality of lens elements arranged in the vicinity of the center of the second fly-eye lens is less than a thickness of a lens element of the second fly-eye lens located adjacent to the plurality of lens elements arranged in the vicinity of the center of the second fly-eye lens, and
wherein a thickness of the lens element of the second fly-eye lens located adjacent to the plurality of lens elements arranged in the vicinity of the center of the second fly-eye lens is less than a thickness of a lens element of the second fly-eye lens located at an edge of the second fly-eye lens.

* * * * *